June 9, 1931.  J. E. ESHBAUGH  1,809,682

INSTRUMENT CLAMP AND LIGHT HOUSING

Filed Dec. 12, 1928

Inventor
Jesse E. Eshbaugh
By Blackmore, Spencer & Flink
Attorneys

Patented June 9, 1931

1,809,682

UNITED STATES PATENT OFFICE

JESSE E. ESHBAUGH, OF FLINT, MICHIGAN, ASSIGNOR TO A C SPARK PLUG COMPANY, OF FLINT, MICHIGAN, A COMPANY OF MICHIGAN

INSTRUMENT CLAMP AND LIGHT HOUSING

Application filed December 12, 1928. Serial No. 325,440.

The present invention may be regarded as a clamp having one of its compression elements specialized to serve as a housing; or it may, with no less accuracy, be referred to as a lamp housing whose inner or back element is so extended and bent as to provide essential parts of a clamp organization,—the latter typically including both a bolt-receiving plate and a compression element suitable to be used in retaining a flanged instrument in such a position upon an apertured instrument board, or the like, as to provide for lateral illumination of said instrument from a lamp in said housing; but it should be understood that either the housing element or the clamp referred to, or both, may differ widely in form and/or in function from those herein described by way of illustration.

It is an object of this invention to provide means whereby the mere securing of an instrument in an aperture may incidentally and inexpensively provide properly positioned means for the illumination thereof.

Other objects of the present invention including, among other things, (1) The equipment of the mentioned housing with a separate and arcuate partition or curtain element so formed as to define a lateral aperture opposite a corresponding aperture in an instrument to be illuminated, (2) The provision of a bulb-passing opening surrounded by socket-positioning elements in the back of said housing, and (3) The provision of combined clamp and light housing whose parts may be initially rotated together, about the center of an instrument received in an aperture and then rigidly secured in the desired angular relationship may be best appreciated from the following description of an illustrative embodiment of said invention, taken in connection with the appended claims and the accompanying drawings.

Figure 1 may be referred to as a forward-looking elevational view, a part of a dash or instrument board being shown as broken away.

Figure 1:
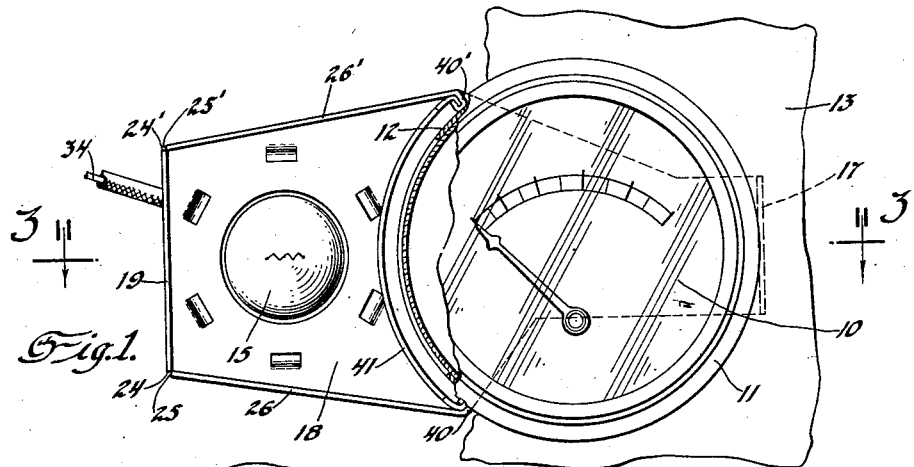
Figure 2:
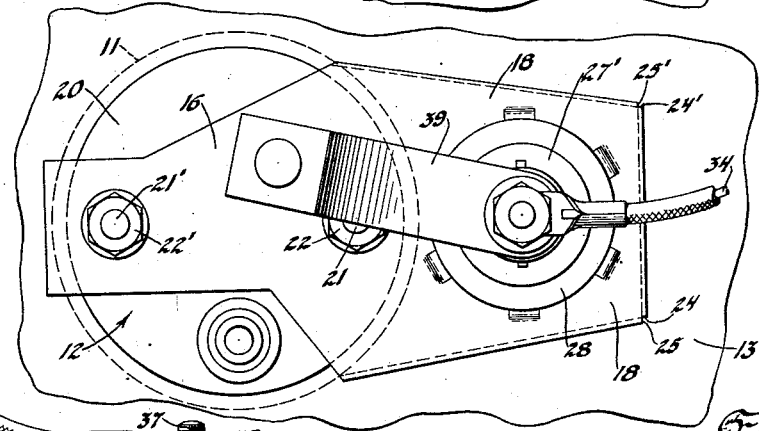
Figure 2 is a view taken from the opposite direction,—as if from under the cowl of an automotive vehicle.

Referring to the details of that specific embodiment of the present invention chosen for the purposes of illustration, an instrument 10, which may be a pressure gage or the like, is shown as provided not only with a flange or bezel 11 but as including a casing 12,—of less diameter than said flange and adapted to be normally concealed behind a dash or instrument board or panel 13; and said instrument is shown as provided with a lateral opening 14, for the admission of a limited beam of light from an external source such as an incandescent bulb 15.

The mentioned parts being of any or usual design or construction, the present invention should be understood to relate more particularly to the use therewith of a novel combination including both a retaining means, adapted to draw the flange 11 against the plate 13, or its equivalent, and a housing for the incandescent bulb 15. For example: a bolt-receiving clamp plate 16 may be integral not only with a compression element in the form of a compression leg or flange 17, engaging the plate 13 but with a laterally extending back plate or socket-carrying wall element 18 of a light housing comprising also side walls and/or an end wall 19,—the latter being shown as a flange or compression leg substantially parallel with and equal in length to the mentioned flange 17.

The inner or back element 20 of the instrument casing 12 is shown as provided with tension elements in the form of bolts 21, 21' carrying nuts 22, 22',—washers 23, 23' being interposed between said nuts and the apertured plate element 16; and edges 24, 24' of the end wall element 19 are shown as engaged by abutting edges 25, 25' of lateral wall elements 26, 26',—which may or may not complete a housing for the light bulb 15, or its equivalent.

The bulb is shown as associated with a plug 27, removably received within a socket element 27'. Said socket element may be provided with a flange 28, and also with notches 29 in an inner edge or face 30,—said notches being adapted to receive pins 31 upon the plug 27; and the back wall 18 of the described light housing is shown as provided not only with a bulb-passing opening 32 but with struck-up concentric lugs adapted to prevent lateral movement of said socket element so long as the flange 28 thereof is pressed into engagement with the wall 18. To conduct current from a wire or cable 34 to an end contact element 35, provided upon the plug 27, a conductive element 36 is shown as connected with said wire or cable by means comprising a threading element 37 and a nut 38; and the parts last referred to may be yieldably advanced by means such as a spring finger 39. Said finger may be pivotally or otherwise secured to the plate 18 or to some part integral therewith and adapted normally to retain the pins 31 within the notches 29 and also to retain the flange 28 in conductive contact with the plate 18,—whether for a supporting or for a grounding effect, or for both.

The parts last referred to being elsewhere separately disclosed and herein described only for the sake of completeness, it should be noted that the respective lateral walls 26, 26' of the described light housing are adapted to substitute for or supplement end wall 19 not only in withstanding the compression applied thereto by the tightening of nuts 22, 22' but also in the retention and reflection of light; and said lateral wall elements are shown as respectively provided with inturned ends 40, 40', suitable for the guidance and/or retention of a partition element 41,—the latter being shown as inwardly bowed and as so cut and positioned as to provide a light-passing aperture 42, adapted to cooperate with the mentioned aperture 14 in casing 12 in the admission of a restricted beam of light to said casing.

The inturned edges 40, 40' may be so spaced as snugly to engage casing 12; the rigidity of the plates 16 and 18 and parts integral therewith and required to serve as compression elements may be enhanced by any desired corrugations or bent edges, not shown; and either of the plates 16, 18, may obviously be regarded as a lateral extension of the other. It will be seen that the formation of the partition 41 from a separate fragment of sheet metal, in preference to forming one or both of the walls 26, 26' or other mentioned parts to include the same, is economical of material and enables said partition to be given any desired special configuration without changing the dies employed in forming and bending the main blank comprising plates 16 and 18; and that no change in dies is required to adapt the described combination to considerable differences in the depth of instruments 10 or in the thickness of panels 13.

Figure 3:
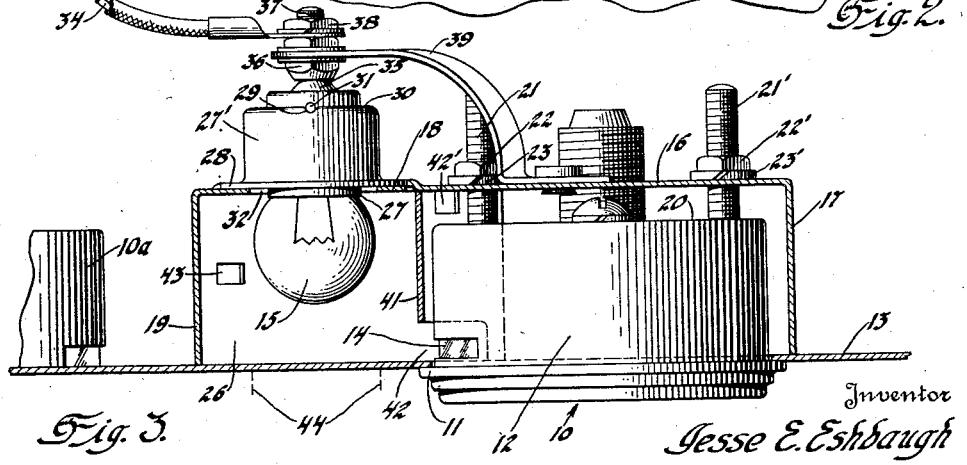
Figure 3 is, for the most part, a sectional view, taken substantially as indicated by the line 3—3 of Figure 1,—optional features of modification being incidentally suggested.

In order to emphasize the fact that, when used to define a light housing, the mentioned partition and/or walls may be so positioned or formed as alternatively or additionally to transmit restricted beams of light back of the plate 13 and/or casing 12, as for the purpose of locating (say) a switch lock (not shown) and/or illuminating an instrument or instruments 10a, the partition 41 and the wall 26 are respectively shown in Figure 3 as notched at 42' and as apertured at 43,—to permit exit of lateral rays additional to those illuminating the instrument 12; and the plate 13 might obviously be provided with a bulb-passing or other light exit, or with a capped opening, in the region defined by dotted lines 44; but it should be understood not only that the walls 18, 19, 26, 26' and the partition 41 may ordinarily be entire and be rigidly retained and adapted to cooperate in a light-confining and integrating or other desired effect, and that the blank-forming, bending and assembling operations above referred to are comparatively simple and inexpensive, but also that the entire organization described may, in installation, be rotatively adjusted, with reference to the axis of the instrument 10, before nuts 23 are tightened to apply tension to the bolts 21, 21', through compression of legs or flanges 17 and 19 and/or 26, 26',—to hold all parts in their indicated relationships.

Finally, it should be understood not only that various parts of a combined light housing and compression-withstanding clamp of the described character might be independently employed but also that numerous modifications, additional to those suggested therein, might easily be devised without involving the slightest departure from the spirit and scope of the present invention.

I claim:

1. In an automotive vehicle: an instrument board provided with a circular aperture; an instrument initially rotatable therein and including a casing which has both a flange engaging said board and also a lateral light-admitting aperture; and a combined compression-flange clamp and light housing,—which is provided with means for retaining said instrument in the aperture in said instrument board and with means for retaining illuminating means within said housing and opposite said aperture.

2. In an automotive vehicle: an apertured instrument board; an instrument including a flanged casing which has a lateral light-admitting aperture; a combined compression-flange clamp and light housing providing integral compression legs and carrying tension means for retaining the flange of said instrument adjacent an aperture in said instrument board; and means for positioning illuminating means within said housing,—said housing being provided with a partial partition so formed and disposed as to admit light to said casing through said lateral aperture.

In testimony whereof I affix my signature.

JESSE E. ESHBAUGH.